United States Patent [19]

Sun

[11] Patent Number: 4,866,208

[45] Date of Patent: Sep. 12, 1989

[54] META-PHENYLENE DIAMINE DERIVATIVES

[75] Inventor: Kwok K. Sun, North Haven, Conn.

[73] Assignee: The Dow Chemical Company, Midland, Mich.

[21] Appl. No.: 232,036

[22] Filed: Aug. 15, 1988

Related U.S. Application Data

[60] Division of Ser. No. 424,347, Sep. 27, 1982, Pat. No. 4,792,623, which is a continuation-in-part of Ser. No. 332,534, Dec. 21, 1981, abandoned.

[51] Int. Cl.$^4$ .............................................. C07C 87/40
[52] U.S. Cl. .................................................... 564/308
[58] Field of Search ............................... 564/306, 308

[56] References Cited

U.S. PATENT DOCUMENTS

| | | | |
|---|---|---|---|
| 3,424,795 | 1/1969 | Lund et al. | 260/570 |
| 3,428,610 | 2/1969 | Klebert | 260/75 |
| 3,678,112 | 7/1972 | Wollensak et al. | 260/578 |
| 3,678,113 | 7/1972 | Klopfer | 260/578 |
| 3,862,233 | 1/1975 | Dunn | 260/578 |
| 4,218,543 | 8/1980 | Weber et al. | 521/51 |
| 4,556,676 | 12/1985 | Welch, Jr. et al. | 564/308 |

FOREIGN PATENT DOCUMENTS

| | | | |
|---|---|---|---|
| 0076669 | 4/1983 | European Pat. Off. | 564/308 |
| 1205091 | 11/1965 | Fed. Rep. of Germany | 564/308 |
| 1768697 | 12/1971 | Fed. Rep. of Germany | 564/308 |
| 3321582 | 12/1984 | Fed. Rep. of Germany | 564/308 |

*Primary Examiner*—Glennon H. Hollrah
*Assistant Examiner*—Raymond Covington
*Attorney, Agent, or Firm*—James S. Rose

[57] ABSTRACT

Novel meta phenylenediamines are provided having one or two particular benzyl radicals as substituents along with other optional substituents on the aromatic diamine ring and optionally substituents on the benzyl aromatic ring.

The diamines are sterically hindered and thereby have lower amine reactivity as compared with the unsubstituted diamines.

The diamines are useful as curing agents for epoxy resins and find particular utility as extenders in the formation of novel polyurethane-polyurea polymers.

2 Claims, No Drawings

META-PHENYLENE DIAMINE DERIVATIVES

CROSS REFERENCE TO RELATED APPLICATION

This is a division of Ser. No 424,347 filed Sept. 27, 1982, now U.S. Pat. No. 4,792,623, which is a continuation-in-part of application Ser. No. 332,534 filed Dec. 21, 1981, now abandoned.

BACKGROUND OF THE INVENTION

1. Field of the Invention

This invention relates to aromatic amines and is more particularly concerned with a novel class of alkylated meta-phenylenediamines.

2 Description of the Prior Art

Aromatic amines and particularly aromatic diamines are well known types of compounds finding many applications in the chemical art. Typically, aromatic amines have found utility as starting materials and intermediates in the preparation of other products such as isocyanates, pharmaceuticals, various types of polymers, plastics, and the like. Some of the aromatic diamines find particular utility as curatives in various polymer systems.

Other known classes of aromatic diamines include, typically, the α,α'-bis(aminoaryl)xylenes disclosed in U.S. Pat. No. 3,424,795; the limited number of nuclear alkylated aromatic amines and diamines disclosed in U.S. Pat. Nos. 3,678,112; 3,678,113 and 3,862,233; the alkylated toluenediamines and alkylated 4,4'-diaminodiphenylmethanes disclosed in U.S. Pat. Nos. 3,428,610 and 4,218,543; certain meta- or para-isopropenylphenylbenzyl derivatives of aromatic mono- and diamines in German DS No.17 686 97; and finally simple diamines such as the diaminodiphenylmethanes, toluenediamines, and the like.

I have now discovered a novel class of sterically hindered aromatic meta-phenylene diamines which are easily obtained from readily available starting materials. Further, the aromatic diamines in accordance with the present invention exhibit a wide range of amine basicity or reactivity depending on the extent of the steric hindrance which, in turn, depends on the extent of the substitution in the three possible positions ortho to the two amino groups on the aromatic ring.

Not only can the amine reactivity, i.e. amine basicity, be varied depending on the substitution noted above but other important molecular properties such as compound solubility and melting ranges can be influenced depending on the particular structure and/or isomer mixtures chosen.

The ability to influence amine basicity in the present diamines makes them particularly useful as chain extenders in polyurethane-polyurea polymers which application will be discussed in detail below as part of the present invention.

SUMMARY OF THE INVENTION

This invention comprises m-phenylenediamines (I) having (a) at least one, and not more than two, of the positions ortho to the amino groups substituted by a member selected from benzyl groups having the formulae:

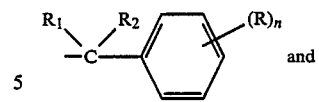

and

wherein $R_1$ is selected from the class consisting of hydrogen and lower alkyl, $R_2$ is lower alkyl, $C_nH_{2n}$ is alkylene having from 2 to 5 carbon atoms in the chain, R is an inert substituent, n is an integer from 0 to 5, m is an integer from 0 to 4; and (b) a member selected from the group consisting of hydrogen and lower alkyl attached to the nuclear carbon atoms ortho to the amino groups which do not carry one of said benzyl groups.

This invention also comprises m-phenylenediamines according to the above definition which are additionally substituted by hydrocarbyl on the nuclear carbon atom which is in the meta position with respect to the two amino groups.

Preferred m-phenylenediamines (II) in accordance with the present invention have (a) at least one, and not more than two, of the positions ortho to the amino groups substituted by a benzyl group having the formula

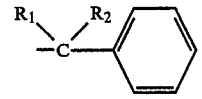

wherein $R_1$ and $R_2$ are as defined above; and (b) a member selected from the group consisting of hydrogen and lower alkyl attached to the nuclear carbon atoms ortho to the amino groups which do not carry one of said benzyl groups.

This invention also comprises polyurethane-polyurea polymers prepared by reaction of an organic polyisocyanate, a polyol, and an extender wherein the improvement comprises employing as the extender a m-phenylenediamine according to (I) above.

The term "lower alkyl" means alkyl having from 1 to 8 carbon atoms, inclusive, such as methyl, ethyl, propyl, butyl, amyl, hexyl, heptyl, octyl, and isomeric forms thereof.

The preferred lower alkyl radicals have 1 to 4 carbon atoms and are as defined above.

The term "alkylene from 2 to 5 carbon atoms" means 1,2-ethylene, 1,3-propylene, 1,2-propylene, 1,4-butylene, 1,3-butylene, 1,2- and 2,3-butylene, 1,5-pentylene, 1,4-pentylene, 1,2-, 2,3-, 1,3- and 2,4-pentylene, and the like. Preferred alkylene is 1,2-ethylene.

The term "hydrocarbyl" means the monovalent radical obtained by removing one hydrogen atom from the parent hydrocarbon having from 1 to 18 carbon atoms Illustrative of hydrocarbyl are alkyl such as methyl, ethyl, propyl, butyl, pentyl, hexyl, octyl, decyl, dodecyl, hexadecyl, octadecyl, and the like, including isomeric forms thereof; alkenyl such as vinyl, allyl, butenyl, pentenyl, hexenyl, octenyl, decenyl, undecenyl, tridecenyl, hexadecenyl, octadecenyl, and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclo octyl and the like including isomeric forms thereof; and cycloalkenyl such as cyclopentenyl, cyclohexenyl, cycloheptenyl, cyclo öctenyl, and the like, including isomeric forms threof.

The hydrocarbyl groups can be substituted by one or a plurality of substituents provided the latter are not reactive with amine groups Illustrative of such substituents are halo, i.e. chloro, bromo, fluoro and iodo; nitro; alkoxy from 1 to 8 carbon atoms, inclusive, such as methoxy, ethoxy, propoxy, butoxy, pentyloxy, hexyloxy, heptyloxy, octyloxy and the like, including isomeric forms thereof; alkylmercapto from 1 to 8 carbon atoms, inclusive, such as methylmercapto, ethylmercapto, propylmercapto, butylmercapto, pentylmercapto, hexylmercapto, heptylmercapto, octylmercapto, and the like, including isomeric forms thereof; and cyano.

A preferred class amongst the hydrocarbyl groups is the alkyl class defined above and a preferred species is methyl.

The term "inert substituent" means any radical which does not react with the amino groups and is inclusive of the hydrocarbyl groups which may or may not be substituted by inert groups as defined above.

The preferred inert substituents are halogen with chlorine most preferred.

The diamines in accordance with the present invention are useful for all the purposes set forth above for the prior art aromatic diamines but they find utility as curatives for polymer systems such as epoxy resin curatives and find particular utility as extenders in polyurethanes.

DETAILED DESCRIPTION OF THE INVENTION

Generally speaking, the aromatic diamines in accordance with the invention are crystalline solids. Depending upon the extent and type of substitution on the aromatic ring, the diamines can range from low to high melting solids, for example, having melting points from about 80° C. or lower, to a high of about 240° C. or higher with values intermediate therebetween. However, some diamines are liquids or oils even when in a pure state.

The aromatic diamines in accordance with the present invention are further characterized by having, for the most part, good solubility in common organic solvents such as ketones, alcohols, ethers, esters, chlorinated hydrocarbon solvents, dipolar aprotic solvents, and the like. Generally speaking, compound solubility can be increased by employing isomer mixtures of the diamines of formula (I).

In a surprising, and advantageous, feature of the aromatic diamines in accordance with the present invention, their reactivities as measured by their relative reactivities with phenyl isocyanate, can cover a relatively broad range depending on the type and extent of substitution on the aromatic diamine ring. In the test procedure, the subject diamine is reacted with a stoichiometric amount of phenyl isocyanate at a dilute reactant concentration level (for example about 6.8 weight percent) in a solvent (for example dimethylacetamide) at ambient room temperature (about 20° C.) under Argon and the disappearance of the isocyanate band (2250 cm$^{-1}$) in the infrared is followed on aliquot samples Illustratively, 5-($\alpha\alpha$-dimethylbenzyl)-2,4-toluenediamine in accordance with the present invention is characterized by a reactivity approximately equal to MOCA or approximately 1/150 of 4,4'-methylenebis(aniline). 3,5-bis($\alpha\alpha$-dimethylbenzyl)-2,6-toluenediamine in accordance with the present invention is approximately ⅓ of MOCA in reactivity.

Therefore, the aromatic diamines in accordance with the present invention can provide a range of basic reactivities depending on the application in which they are being employed.

Illustrative, but not limiting, of the aromatic diamines in accordance with the present invention are 4-($\alpha$-methylbenzyl)-m-phenylenediamine, 4-($\alpha$-methyl-p-methylbenzyl)-m-phenylenediamine, 4-($\alpha$-methyl-p-ethylbenzyl)-m-phenylenediamine, 4-($\alpha$-methyl-p-propylbenzyl)-m-phenylenediamine, 4-($\alpha$-methyl-p-butylbenzyl)-m-phenylenediamine, 4-($\alpha$-methyl-p-hexylbenzyl)-m-phenylenediamine, 4-($\alpha$-methyl-p-amylbenzyl)-m-phenylenediamine, 4-($\alpha$-methyl-p-heptylbenzyl)-m-phenylenediamine, 4-($\alpha$-methyl-p-octylbenzyl)-m-phenylenediamine, 4-($\alpha$-methyl-p-nonylbenzyl)-m-phenylenediamine, 4-($\alpha$-methyl-p-decyl-benzyl)-m-phenylenediamine, 4-($\alpha$-methyl-p-octadecyl-benzyl)-m-phenylenediamine, 4-($\alpha$-methyl-p-isopropyl-benzyl)-m-phenylenediamine, 4-($\alpha$-methyl-p-isobutyl-benzyl)-m-phenylenediamine, 4-($\alpha$-methyl-p-2-ethylhexyl-benzyl)-m-phenylenediamine, 4-($\alpha$-methyl-p-isononyl-benzyl)-m-phenylenediamine, 4-($\alpha$-methyl-p-chlorobenzyl)-m-phenylenediamine, 4-($\alpha$-methyl-p-bromobenzyl)-m-phenylenediamine, 4-($\alpha$-methyl-p-methoxybenzyl)-m-phenylenediamine, 4-($\alpha$-methyl-p-benzylbenzyl)-m-phenylenediamine, 4-($\alpha$-methyl-p-phenethylbenzyl)-m-phenylenediamine, 4-($\alpha$-methyl-p-phenylbenzyl)-m-phenylenediamine, 4-($\alpha$-methyl-p-tolylbenzyl)-m-phenylenediamine, 4-($\alpha$-methyl-p-allylbenzyl)-m-phenylenediamine, 4-($\alpha$-methyl-p-cyclobutylbenzyl)-m-phenylenediamine, 4-($\alpha$-methyl-p-cyclopentylbenzyl)-m-phenylenediamine, 4-($\alpha$-methyl-p-cyclohexylbenzyl)-m-phenylenediamine, 4-($\alpha$-methyl-p-cycloheptylbenzyl)-m-phenylenediamine, 4-($\alpha$-methyl-p-cyclooctylbenzyl)-m-phenylenediamine, 4-[$\alpha$-methyl-p-(1-cyclopentenyl)]-m-phenylenediamine, 4-[-methyl-p-(1-cyclohexenyl)benzyl]-m-phenylenediamine, and the like; 4-($\alpha$-ethylbenzyl)-m-phenylenediamine, 4-($\alpha$-propylbenzyl)-m-phenylenediamine, 4-($\alpha$-butylbenzyl)-m-phenylenediamine, 4-($\alpha$-amylbenzyl)-m-phenylenediamine, 4-($\alpha$-hexylbenzyl)-m-phenylenediamine, 4-($\alpha$-heptylbenzyl)-m-phenylenediamine, 4-($\alpha$-octylbenzyl)-m-phenylenediamine, 4-($\alpha$-ethyl-2,4-dimethylbenzyl)-m-phenylenediamine, 4-($\alpha,\alpha$-dimethylbenzyl)-m-phenylenediamine, 4-($\alpha,\alpha$-diethylbenzyl)-m-phenylenediamine, 4-($\alpha$-methyl-$\alpha$-propylbenzyl)-m-phenylenediamine, 4-(1-benzocyclopentyl)-m-phenylenediamine, 4-(1-benzocyclohexyl)-m-phenylenediamine, 4-(1-benzocycloheptyl)-m-phenylenediamine, 4-(1-benzocyclooctyl)-m-phenylenediamine, 4-[1-(1-methylbenzocyclopentyl)]-m-phenylenediamine, 4-($\alpha,\alpha$dimethylbenzyl)-5-methyl-m-phenylenediamine, 4-($\alpha,\alpha$-dimethylbenzyl)-5-ethyl-m-phenylenediamine, 4-($\alpha,\alpha$-dimethylbenzyl)-5-methoxy-m-phenylenediamine, 4-($\alpha,\alpha$-dimethylbenzyl)-5-allyl-m-phenylenediamine, and the like; 4,6-bis($\alpha$-methylbenzyl)-m-phenylenediamine, 4,6-bis($\alpha$-methyl-p-methylbenzyl)-m-phenylenediamine, 4,6-bis($\alpha,\alpha$-dimethylbenzyl)-m-phenylenediamine, 4,6-bis($\alpha\alpha$-dimethylbenzyl)-5-methoxy-m-phenylenediamine, and the like; 5-(α-methylbenzyl)-2,4-toluenediamine, 5-(α-methyl-p-tolylbenzyl)-2,4-toluenediamine, 5-(α-methyl-p-ethylbenzyl)-2,4-toluenediamine, 5-(α-methyl-p-chlorobenzyl-2,4-toluenediamine, 4-(α-methylbenzyl)-6-ethyl-m-phenylenediamine, 4-(α-methylbenzyl)-6-butyl-m-phenylenediamine, 4-(α-methylbenzyl)-6-octyl-m-phenylenediamine, 5-(α,α-dimethylbenzyl)-2,4-toluenediamine, 5-(α,α-diethylbenzyl)-2,4-toluenediamine, 5-(α,α-dimethyl-p-tolylbenzyl)-2,4-toluenediamine, 5-(α-ethylbenzyl)-2,4-toluenediamine, 5-(α,α-dimethyl-p-chlorobenzyl)-2,4-toluenediamine, 5-(α,α-dimethyl-p-phenethylbenzyl)-2,4-toluenediamine, 5-(1-benzocyclopentyl)-2,4-toluenediamine, 5-(1-benzocyclohexyl)-2,4-toluenediamine, 5-(α,α-dimethylbenzyl)-6-methyl-2,4-toluenediamine, 5-(α,α-dimethylbenzyl)-6-ethyl-2,4-toluenediamine, 5-(α,α-dimethylbenzyl)-6-allyl-2,4-toluenediamine, 5-(α,α-dimethybenzyl)-6-methoxy-2,4-toluenediamine, 3,5-bis(1-benzocyclopentyl)-2,4-toluenediamine, 3-(1-benzocyclopentyl)-2,4-toluenediamine, 3-(α-methylbenzyl)-2,4toluenediamine, 3-(α,α-dimethylbenzyl)-2,4-toluenediamine, 3-(α,α-dimethyl-p-chlorobenzyl)-2,4-toluenediamine, 3-(α, α-dimethyl-4-methoxybenzyl)-2,4-toluenediamine, and the like; 3-(α-methylbenzyl)-2,6-toluenediamine, 3-(α,α-dimethylbenzyl)-2,6-toluenediamine, 3-(α,α-dimethylbenzyl)-4-methyl-2,6-toluenediamine, 3-(α,α-dimethylbenzyl)-4-ethyl-2,6-toluenediamine, 3-(α, α-dimethylbenzyl)-4-allyl-2,6-toluenediamine, 3-(α,α-dimethylbenzyl)-4-methoxy-2,6-toluenediamine, 3,5-bis(α,α-dimethylbenzyl)-2,6-toluenediamine, 3,5-bis(α,α-dimethylbenzyl)- 4-methoxy-2,6-toluenediamine, 3-(α-methyl-α-ethyl-benzyl)-2,6-toluenediamine, 3-(α-methyl-α-butyl-benzyl)- 2,6-toluenediamine, 3-(α,α-dimethyl-p-tolylbenzyl)-2,6toluenediamine, 3-(α,α-dimethyl-p-chlorobenzyl)-2,6-toluenediamine, 3-(1-benzocyclopentyl)-2,6-toluenediamine, 3-(1-benzocyclohexyl)-2,6-toluenediamine, 3-(α,α-dimethylbenzyl)-5-methyl-2,6-toluenediamine, 4-(α,α-dimethylbenzyl)-2-ethyl-m-phenylenediamine, 4-(α,α-dimethylbenzyl)-2-butyl-m-phenylenediamine, 4-(α,α-dimethylbenzyl)-2-octyl-m-phenylenediamine, and the like.

Preferred amongst the aromatic diamines set forth above are those having either the 2,4-, or 2,6-toluenediamine nucleus, and most preferred within each of those two groups are those having the α,αdimethylbenzyl substituent group on said toluenediamine nucleus. Particularly preferred are the diamine mixtures comprising (a) from about 70 to about 95 percent by weight of 5-(α,α-dimethylbenzyl)-2,4-toluenediamine and (b) the remaining 30 to 5 percent by weight being 3-(α,α-dimethylbenzyl)-2,6-toluenediamine based on the combined weights of (a) and (b).

The aromatic diamines (I) in accordance with the present invention are readily prepared by alkylating the appropriately substituted aromatic diamines (III) with an appropriate styrene compound (IVa) or precursor thereof (discussed in detail below) or an appropriate benzocycloalkene compound (IVb) according to the following schematic equation

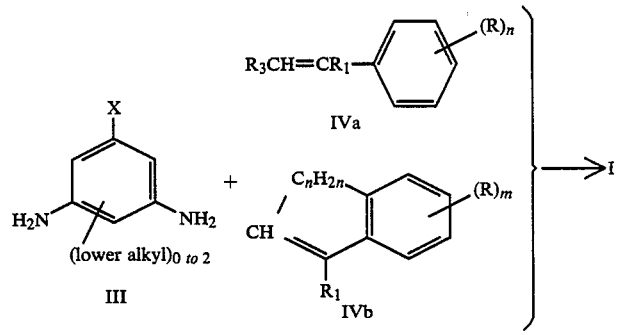

wherein X is hydrogen or hydrocarbyl, R, $R_1$, m and n are defined as above, $R_3$ is hydrogen or lower alkyl, $C_nH_{2n}$ is alkylene having 1 to 4 carbon atoms similar to alkylene defined above but having the smaller carbon atom range; and the alkylidene ($R_3CH=$) and cycloalkylidene ($C_nH_{2n}CH=$) of (IVa) and (IVb) become the $R_2$ and the $C_nH_{2n}$ respectively of the m-phenylenediamines (I) defined above.

Generally speaking, the alkylation is carried out conveniently by heating the reactants in the appropriate proportions in the presence of a catalyst until the desired compound (I) is formed. For typical reaction methods and conditions see the art cited supra, particularly DS No. 1768697, and see also U.S. Pat. No.4,008,275 for typical catalysts.

Optionally, an inert organic solvent may be employed such as chlorobenzene, dichlorobenzene, nitrobenzene, and the like, and the resulting mixture or solution is brought into contact with the catalyst and the mixture stirred at the appropriate temperature.

Alternatively, and in a preferred embodiment, no organic solvent is employed but rather an excess of one reactant over the other is used. The reaction of (III) with (IVa) or (IVb) is an equilibrium process and by using an excess of one reactant the dual purpose of a solvent effect and the shifting of the reaction equilibrium toward higher conversions is achieved.

It will be readily understood by those skilled in the art that the choice of which reactant to use in excess to achieve the maximum yield of desired product (I) can readily be determined by trial and error by one skilled in the art.

Advantageously, the molar proportions of (IVa) or (IVb) to diamine (III) can fall within the ratios of about 20/1 to 1/20, preferably about 10/1 to 1/10. In a preferred mode of preparation, the (IVa) or (IVb) is used in a molar excess over (III) of about 10/1 to about 5/1.

Since compounds in accordance with the present invention can have two of the benzyl radicals arising from the double alkylation of the starting amine, such dialkylated products can be prepared in either a one-step reaction, wherein both alkylations take place in the one procedure, or, alternatively, in a two-step procedure wherein the first monoalkylated compound is formed and then alkylated in a second step to introduce the second benzyl radical.

Ordinarily, the alkylation is carried out at elevated temperatures, advantageously within a range of from about 40° C. to about 250° C.

The reaction mixture is preferably stirred with the catalyst component in any suitable reaction vessel, preferably, under an inert atmosphere such as nitrogen or argon at a temperature falling within the above range. Heating is continued until routine analytical procedures, carried out on an aliquot, indicate that reaction is substantially complete.

Illustrative of such analytical procedures are high pressure liquid chromatography (HPLC) to determine weight percent of components in the mixture, nuclear magnetic resonance (Nmr) and infrared spectroscopy, and the like.

Any convenient alkylation catalyst used for aromatic amine alkylation can be employed. Typically useful are the aqueous mineral acids, clays, acid clays, diatomaceous earths, zeolites, aromatic sulfonic acids and the salts formed between the starting diamines (III) and said aromatic sulfonic acids, and the like. For a discussion on such catalysts see U.S. Pat.No. 4,008,275 whose disclosure in respect thereof is hereby incorporated by reference.

A preferred group of catalysts for the preparation of the aromatic diamines (I) include the natural and synthetic zeolites and aromatic sulfonic acids and the salts formed between the starting diamines (III) and said aromatic sulfonic acids.

Generally speaking the catalyst is employed within a range of from about 5 weight percent to about 95 weight percent based on the combined weight of diamine and catalyst.

Illustrative of the diamines (III) which may be employed are m-phenylenediamine, 2,4-toluenediamine, 2,6-toluenediamine, 4-ethyl-m-phenylenediamine, 4-propyl-m-phenylenediamine, 4-butyl-m-phenylenediamine, 4-octyl-m-phenylenediamine, 5-methyl-m-phenylenediamine, 5-ethyl-m-phenylenediamine, 5-propyl-m-phenylenediamine, 5-butyl-m-phenylenediamine, 5-octyl-m-phenylenediamine, 5-methoxy-m-phenylenediamine, 5-allyl-m-phenylenediamine, 5-phenyl-m-phenylenediamine, 5-benzyl-m-phenylenediamine, 5-cyclohexyl-m-phenylenediamine, 2-ethyl-m-phenylenediamine, 2-butyl-m-phenylenediamine, 2-octyl-m-phenylenediamine, 6-methyl-2,4-toluenediamine, 6-ethyl-2,4-toluenediamine, 6-allyl-2,4-toluenediamine, 6-methoxy-2,4-toluenediamine, 6-phenyl-2,4-toluenediamine, 6-benzyl-2,4-toluenediamine, 6-cyclohexyl-2,4-toluenediamine, 4-methyl-2,6-toluenediamine, 4-ethyl-2,6-toluenediamine, 4-allyl-2,6-toluenediamine, 4-methoxy-2,6-toluenediamine, 4-phenyl-2,6-toluenediamine, 4-benzyl-2,6-toluenediamine, 4-cyclohexyl-2,6-toluenediamine, and the like.

Preferred starting diamines are the 2,4- and 2,6-toluenediamines. Particularly preferred are the mixtures comprising from about 60 to 85 percent by weight of 2,4-toluenediamine and 40 to 15 percent by weight being 2,6-toluenediamine.

Illustrative of the styrenes which can be employed in the preparation of the compounds of the invention are styrene itself, p-methylstyrene, p-ethylstyrene, p-propylstyrene, p-butylstyrene, p-amylstyrene, p-hexylstyrene, p-heptylstyrene, p-octylstyrene, p-nonylstyrene, p-decylstyrene, p-octadecylstyrene, p-isopropylstyrene, p-isobutylstyrene, p-2-ethylhexylstyrene, p-isononylstyrene, p-chlorostyrene, p-bromostyrene, p-methoxystyrene, p-benzylstyrene, p-phenethylstyrene, p-phenylstyrene, p-tolylstyrene, p-allylstyrene, p-cyclobutylstyrene, p-cyclopentylstyrene, p-cyclohexylstyrene, p-cycloheptylstyrene, p-cyclooctylstyrene, p-(1-cyclopentenyl)styrene, p-(1-cyclohexenyl)styrene, and the like; β-methylstyrene, β-ethylstyrene, β-propylstyrene, β-butylstyrene, β-pentylstyrene, β-hexylstyrene,β-heptylstyrene, β-methyl-2,4-dimethylstyrene, and the like; α-methylstyrene, α-ethyl-β-methylstyrene, α-methyl-β-ethylstyrene, indene, benzocyclohexene-1, benzocycloheptene-1, benzocyclooctene-1, 1-methylindene, α-methyl-p-chlorostyrene, α-methyl-p-bromostyrene, α-methyl-p-tolylstyrene, α-methyl-p-ethylstyrene, α-methyl-p-butylstyrene, α-methyl-p-benzylstyrene, α-methyl-p-allylstyrene, α-methyl-p-cyclopentylstyrene, and the like.

In addition to employing the styrenes per se in the preparation of aromatic diamines in accordance with the present invention it is possible to form said compounds in situ by introducing a precursor of any of said compounds which will generate the styrene under the conditions prevailing in the reaction mixture. For example, dimers, trimers, and higher oligomeric forms which will revert to the styrenes under the elevated temperatures and acid conditions of the above described preparation of (I) can be employed therein. Further, the various aryl substituted carbinols such as phenylisopropyl alcohol which on dehydration will provide the appropriate styrene compound can be employed to prepare the compounds of formula (I).

The starting aromatic diamines and styrenes are well known in the art as are the carbinols or oligomeric styrene materials.

As set forth above, the substituted aromatic amines of the invention find particular utility as extenders for the preparation of polyurethane polyureas. The polyurethane-polyurea polymers extended by the diamines having formula (I) can be formed as cellular, microcellular, or solid polyurethane-polyurea polymers using any of the prior art methods known to those skilled in the art; see Polyurethanes: Chemistry and Technology II, by J. H. Saunders and K. C. Frisch, 1964, Interscience Publishers, New York, N.Y., for teaching of the preparation of polyurethanes.

In a preferred embodiment of the present invention the polyurethane-polyurea polymers employing the diamines (I) as extenders are prepared as molded materials, particularly reaction injection molded polyurethane-polyureas; for typical lists of reactants and procedures which can be used in combination with the diamines (I) to produce the polyurethane-polyureas see U.S. Pat. No. 4,296,212 whose disclosure is incorporated by reference herein.

The following examples describe the manner and process of making and using the invention and set forth the best mode contemplated by the inventors of carrying out the invention but are not to be construed as limiting.

EXAMPLE 1

A 100 ml. reaction flask was equipped with a stirrer, thermometer, and reflux condenser. The flask was charged with 29.5 g. (0.25 mole) of α-methylstyrene, 6.48 g. (0.06 mole) of m-phenylene diamine, 7.24 g. (0.04 mole) of m-phenylene diamine dihydrochloride, and 20 ml. of water. The mixture was heated at reflux at 95°-100° C. for 24 hours.

The solution was allowed to cool and mixed with 140 ml. of 1.0N hydrochloric acid. The aqueous solution was washed in a separatory funnel 3× with 50 ml. portions each of methylene chloride in order to remove the excess α-methylstyrene. The resulting aqueous fraction was made slightly basic by the addition of the appropriate amount of 10N sodium hydroxide. An oil separated which was extracted with 2× 40 ml. portions each of methylene chloride.

The combined methylene chloride fractions were washed with 3× 50 ml. portions each of warm water to remove unreacted phenylene diamine. Concentration of the organic layer in vacuum resulted in a solid residue. Vacuum distillation of this residue provided a pale yellow distillate, b.p. 168°-176° C. (0.05 mm pressure of mercury; wt.=7.8 g. (62%) of 4-(α,α-dimethylbenzyl)-1,3-phenylene diamine having the following formula

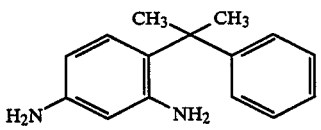

in accordance with the present invention.

The distillate solidified on standing at room temperature and was recrystallized from toluene to afford colorless crystals, m.p. 83°-83.5° C. Nuclear magnetic resonance (Nmr) confirmed the structure along with the following elemental analysis.

Calcd. for $C_{15}H_{18}N_2$: C, 79.60%: H, 8.02%; N, 12.38%; Found: C, 79.63%; H, 8.10%; N, 12.42%.

High pressure liquid chromatography (HPLC) of the original solid residue product prior to vacuum distillation showed the presence of a small amount of a dibenzylated product which product was later prepared in a separate experiment described below.

EXAMPLE 2

A 250 ml. reaction flask equipped with a stirrer, thermometer, reflux condenser and gas outlet tube which was connected to a receiving flask cooled by a cold water bath was charged with 70.8 g. (0.6 mole) of α-methylstyrene, 10.8 g. (0.1 mole) of m-phenylene diamine, and 10 g. of Zeolite XZ-25 100-150 mesh untreated (supplied by W. R. Grace Chemical Co., Baltimore, MD.). Under a slow stream of nitrogen and with rapid stirring, the flask contents were heated. Initially, a small amount of water (from the Zeolite) was co-distilled from the flask with some α-methylstyrene and was collected in the receiving flask. Following this, the nitrogen flow was stopped and the mixture was heated at about 165° C. for 24 hours.

The reaction mixture while still hot was filtered by pouring it through a heated Buchner funnel to remove the Zeolite. Upon cooling to room temperature, a crystalline precipitate separated from the filtrate. The precipitate was collected by suction filtration to provide 17.2 g. of a mixture of predominantly the dibenzylated product 4,6-bis(α,α-dimethylbenzyl)-1,3-phenylene diamine in accordance with

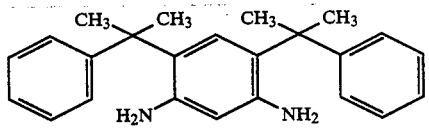

the present invention and a minor amount of the monobenzylated diamine described in Example 1.

Pure dibenzylated product was obtained as colorless crystals by recrystallizing the crude crystalline material twice from toluene. Additional product was isolated by washing the Zeolite catalyst several times with methylene dichloride, combining the methylene dichloride washings with the first filtrate from the reaction mixture and removing the solvent and unreacted α-methylstyrene by distillation to provide a residue, and, finally, treatment with chloroform. Total yield of the isolated dibenzyl product was 58%; m.p. 236°-237° C.; insoluble in ethanol, acetone, ethylene glycol, soluble in methylene dichloride, diethylene glycol dimethyl ether (diglyme), and hot toluene; Nmr confirmed the structure along with the following elemental analysis.

Calcd. for $C_{24}H_{28}N_2$: C, 83.67%; H, 8.19%; N, 8.13%; Found: C, 83.28%; H, 8.37%; N, 8.14%.

Thin layer chromatography (TLC) experiments as well as HPLC analysis on the residue above prior to treatment with chloroform indicated the presence of additional dibenzylated product, the monobenzylated compound of Example 1, unreacted phenylene diamine, a component believed to be polymeric α-methylstyrene and a trace of N-benzylated material.

EXAMPLE 3

A reaction flask equipped as set forth in Example 2 was charged with 2.26 g. (0.01 mole) of 4-(α,α-dimethyl benzyl)-1,3-phenylene diamine, 11.8 g. (0.1 mole) of α-methylstyrene, and 2.0 g. of Zeolite XZ-25.

Using the same procedure as set forth in Example 2, heating of the mixture was commenced. After 4 hours at 160°-165° C. the reaction mixture was analyzed by HPLC and TLC and shown to contain 4,6-bis(α,α-dimethylbenzyl)-1,3-phenylene diamine as the major component along with a minor amount of the starting 4-(α,α-dimethylbenzyl)-1,3-phenylene diamine plus a trace of m-phenylene diamine and a trace of poly α-methylstyrene.

The reaction mixture was treated according to the work-up procedure set forth in Example 2 to afford 2.1 g. (61%) of 4,6-bis(α,α-dimethylbenzyl)-1,3-phenylene diamine in accordance with the present invention.

EXAMPLE 4

A 250 ml. reaction flask equipped according to Example 2 was charged with 12.2 g. (0.1 mole) of 2,4-toluenediamine, 59 g. (0.5 mole) of α-methylstyrene, and 10 g. of Zeolite XZ-25.

Using the same procedure outlined in Example 2, the rapidly stirred mixture was heated for 20 hours at 160° C. HPLC analysis indicated that conversion of the 2,4-toluenediamine was at least 87%. The hot reaction mixture was filtered through a heated Buchner funnel. The collected Zeolite was washed 3× with 20 ml. portions each of methylene chloride. The filtrate and washings were combined and the solvent removed under vacuum leaving a residue. The residue was distilled under vacuum through a simple distillation head first at moderate vacuum to remove α-methylstyrene, i.e. b.p. 110° C. (23 mm. of mercury), then at higher vacuum to collect the following fractions: (1.) b.p. 145°-165° C. (0.05 mm.), wt.=1.6 g. of unreacted 2,4-toluenediamine;(2.) b.p. 165°-173° C. (0.05 mm.), wt.=19.0 g. of 5-(α,α-dimethylbenzyl)-2,4-diaminotoluene; (3.) b.p. 173°-185° C. (0.05 mm., wt.=2.8 g. of 5-(α,α-dimethylbenzyl)2,4-diaminotoluene and two other components which were separated by TLC and believed to be N-alkylated-2,4-toluenediamine and polymerized α-methylstyrene; (4.) residue, wt.=1.3 g. of a mixture of the same components comprising fraction 3.

The fraction 2 was fractionated through a 12 cm. Vigreux column under a vacuum of 0.07 mm. of mercury and using a heating bath temperature starting at about 230° C. and progressing up to about 250° C. to yield the following fractions: (2-1.) b.p. up to 168° C., wt.=0.7 g.; (2—2.) b.p. 168°-176° C., wt.=(4.9 g.;(2-3.) b.p. 176°-177° C., wt.=8.3 g. pale yellow oil;(2-4.) b.p. 177°-172° C., wt.=2.0 g.; residue, wt.=1.0 g. light brown liquid. The major fraction which solidified was 5-(α,α-dimethylbenzyl)-2,4-toluenediamine

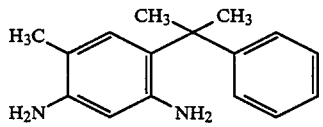

in accordance with the present invention. The crystalline product was found to be very soluble in standard organic solvents including ethylene glycol. It still contained a trace of impurity. The impurity was removed by washing the crystals with low boiling (35°-60° C.) petroleum ether. The product was further recrystallized from a mixture of hot toluene and petroleum ether to provide colorless crystals; m.p. 90.0°-91.5° C. Total weight of product isolated from both fractions 2 and 3 was 19.7 g. (82%). Nmr confirmed the structure along with the following elemental analysis.

Calcd. for $C_{16}H_{20}N_2$: C, 79.95%; H, 8.39%; N, 11.66%; Found: C, 79.80%; H, 8.45%; N, 11.62%.

EXAMPLE 5

The apparatus described in Example 4 was charged with 12.2 g. (0.1 mole) of 2,6-toluenediamine, 59 g. (0.5 mole) of α-methylstyrene, and 10 g. of Zeolite XZ-25.

The reaction mixture was heated in accordance with the procedure set forth in Example 4 at a temperature of about 160° C. After 8 hours the reaction appeared to have reached equilibrium as evidenced by the constancy of the product distribution determined from HPLC analysis of aliquots of the reaction mixture. However, heating was continued for a total of 20 hours so as to have equal reaction conditions with Example 4.

The hot reaction mixture was filtered through a heated Buchner funnel. The collected Zeolite was washed with 3× 20 ml. portions of methylene dichloride and the washings concentrated under vacuum to leave a residue. The latter residue was combined with the filtrate obtained above which upon standing at room temperature had deposited a crystalline precipitate. After standing overnight the crystalline precipitate was collected by suction filtration to provide 18.6 g. of colorless crystals which were recrystallized from a combination of hot methanol and petroleum ether (b.p. 35°-60° C.) to provide large colorless prisms; m.p. 191°-192° C.; soluble in common organic solvents (i.e., acetone, ethanol, etc.) and soluble in ethylene glycol at 100° C. (at least to the extent of 3 to 5% by wt. in ethylene glycol). Nmr and the following elemental analysis confirmed the compound to be 3,5-bis(α,α-dimethylbenzyl)-2,6-toluenediamine in accordance with the present invention.

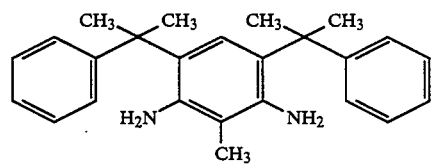

Calcd. for $C_{25}H_{30}N_2$: C, 83.75%; H, 8.43%; N, 7.82%; Found: C, 83.86%; H, 8.61%; N, 7.18%.

The filtrate remaining after removal of the above dibenzylated product was distilled until the boiling point of the distillate reached 110° C. under 23 mm. of mercury pressure in order to remove α-methylstyrene. The residue was further distilled through a 5 cm. empty column under high vacuum (0.04 mm.) and the following fractions were collected:(1.) b.p. 147°-158° C., wt.=0.7 g.; (2.) b.p. 158°-162° C., wt.=0.5 g.; (3.) b.p. 162°-164° C., wt.=3.5 g.; (4.) b.p. 164°-170° C., wt.=1.6 g.; residue, wt.=1.0 g. Fraction 1 was essentially pure 2,6-toluenediamine. Fractions 2 to 4 were essentially pure 3-(α,α-dimethyl benzyl)-2,6-toluenediamine having the formula

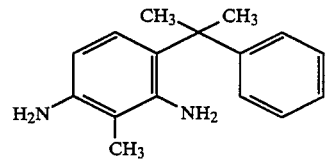

in accordance with the present invention.

Fractions 2 to 4 were recrystallized from a combination of hot carbon tetrachloride and petroleum ether (b.p. 35°-60° C.) to give colorless crystals, m.p 113°-114° C. The structure of this product was confirmed by Nmr and the following elemental analysis.

Calcd. for $C_{16}H_{20}N_2$: C, 79.95%; H, 8.39%; N, 11.66%; Found: C, 79.89%; H, 8.16%; N, 11.73%.

The product yields from this reaction were 23.3% of the monobenzylated material, 54.7% of the dibenzylated material and 6% of the starting 2,6-toluenediamine. A trace of an α-methylstyrene polymer was also obtained in the distillation residue.

Repetition of the above reaction but on a larger scale of starting materials and at 170° C. for 20 hours resulted in a 59% conversion of the starting diamine to form a 56.1% yield of the dibenzylated product and 36.5% yield of the monobenzylated product based on the converted diamine.

EXAMPLE 6

Using the apparatus and procedure described in previous examples, a reaction flask was charged with 36.6 g. (0.3 mole) of 2,4-toluenediamine, 15.3 g. (0.1 mole) of p-chloroisopropenyl benzene, and 10 g. of Zeolite XZ-25 (predried at 400° C. for 3 hours). The mixture was stirred and heated at 200° C. for 24 hours under nitrogen.

After filtration of the reaction mixture, and removal of solvent (methylene chloride) and excess diaminotoluene, the product mixture was distilled under high vacuum (0.07 to 0.05 mm. of mercury). The following six fractions were collected and analyzed by Nmr: 1.) b.p. 50°-52° C., wt.=1.29 g. of p-chloroisopropenyl benzene;(2.) b.p. 140°-175° C., wt.=1.1 g. of 2,4-toluenediamine plus an unknown;(3.) b.p. 175°-192° C., wt.=2.0 g. of 5-(α, α-dimethyl-p-chlorobenzyl)-2,4-toluenediamine plus a small amount of unknown impurity;(4.) b.p. 192°-200° C., and(5.) b.p. 200°-204° C., both (4.) and (5.) together wt.=6.8 g. of crude 5-(α,α-dimethyl-p-chloro-benzyl)-2,4-toluenediamine; (6.) b.p. 204°-218° C., wt.=1.8 g. predominantly 5-(α,α-dimethyl-p-chlorobenzyl)-2,4-toluenediamine plus a small amount of unknown impurity; residue wt.=4.1 g. of tar.

Combined fractions 4 and 5 were further purified firstly by column chromatography by eluting the product from the column using a combination of petroleum ether and methylene chloride (75/25) and collecting it in column chromatographic fractions 7, 8, and 9.

Secondly, the eluted product was distilled b.p. 194°-196° C. (0.05 mm.) to provide a light yellow glass, wt. 10.5 g. (38%). The hydrochloride salt of the product was prepared for further purification by dissolving the amine in ether and passing in dry hydrogen chloride gas until precipitation of hydrochloride ceases. The salt was isolated by filtration, recrystallized once from a mixture of methylene chloride and ether, and recrystalized once from a mixture of methanol and ether. A light yellow colored hydrochloride salt was obtained which was characterized by a double melting point, 184°-188° C. and 210°-214° C.

Upon neutralizing in aqueous solution of the hydrochloride, the free base was obtained which was extracted from the aqueous mixture using 100 ml. of methylene chloride solvent. The solvent was dried over magnesium sulfate and then taken to dryness. Thus there was obtained pure 5-(α,αdimethyl-p-chlorobenzyl)-2,4-toluenediamine having the following srructure in accordance with the present invention and whose structure

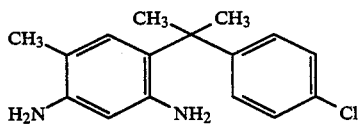

was confirmed by Nmr and the following elemental analysis
Calcd. for C16H19N2Cl: C, 69.93%; H, 6.97%; N, 10.20%; Cl, 12.90% Found C, 69.86%; H, 6.24%; N, 10.15%; Cl, 13.02%.

EXAMPLE 7

Using the same apparatus described in the previous examples except that the reaction flask was additionally equipped with an addition funnel, the following experiment was carried out.

The flask was charged with 61.0 g. (0.5 mole) of 2,4-toluenediamine, and 10.0 g. of Zeolite XZ-25 catalyst. The mixture was heated to 200° C. with rapid stirring under the positive flow of nitrogen. Over a 4 hour period under the above conditions, 4.17 g. (0.04 mole) of styrene was added slowly through the addition funnel to the reaction flask. Heating and stirring was continued for another 4 hour period after the styrene addition was completed. A small amount of styrene still remained refluxing at the end of the 8 hours.

The mixture was cooled to room temperature and treated with 50 ml. of methylene chloride. The catalyst was removed by filtration and to the filtrate was added 100 ml. of petroleum ether (b.p. 35°-60° C.) to precipitate the excess 2,4-toluenediamine which latter was also removed by filtration. The methylene chloride/petroleum ether filtrate was washed 3× with 100 ml. portions each of water. Solvent was stripped from the organic layer under vacuum leaving a residue which was distilled under 0.05 mm. pressure of mercury and the following fractions collected and identified by Nmr analysis: (1.) b.p. 138°-165° C., wt.=0.3 g. of 2,4-toluenediamine; (2.) b.p. 165°-170° C.; (3.) b.p. 170°-180° C., combination of fraction 2 and 3 is 4.9 g. of light yellow oil; 4.) b.p. 180°-183° C., wt.=0.70 g. of 5-(α-methylbenzyl)-2,4-toluenediamine; residue wt.=0.63 g.

The combination of fractions 2 and 3 was subjected to chromatographic separation on a 1"×12" column of silica gel. The following numbered fractions were the ones found to contain product after the solvent was removed and analyzed by Nmr with the eluting solvent noted in parenthesis.

Chromatographic column fraction 1 (petroleum ether), small amount of styrene; chromatographic column fraction 8 (petroleum ether/methylene chloride 85/15), 3-(α-methylbenzyl)-2,4-toluenediamine; chromatographic column fractions 9 to 15 inclusive (petroleum ether/methylene chloride 80/20), a mixture of 3-(α-methylbenzyl)-2,4-toluenediamine, along with the two N-benzylated side-products; chromatographic column fractions 17 to 24, inclusvve (petroleum ether/methylene chloride 3/2), wt.=2.5 g. of pure 5-(α-methylbenzyl)-2,4-toluenediamine.

The latter product crystallized slowly and was eventually recrystallized from a combination of hot toluene and petroleum ether, m.p. 103°-103.5° C. pale yellow needles, total weight of this product was 3.1 g. (34%). Nmr and the following elemental analysis confirmed the following structure in accordance with the present invention

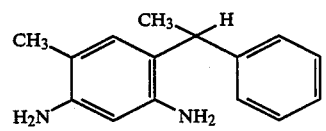

Calcd. for C15H18N2: C, 79.60%; H, 8.02%; N, 12.38%; Found: C, 79.59%; H, 7.97%; N, 12.30%;

The 3-(α-methylbenzyl)-2,4-toluenediamine obtained from chromatographic column fraction 8 remained an oil and was distilled agin, b.p. 170°-174° C. (0.05 mm.) and formed a minor product with a yield of about 5% . The Nmr analysis confirmed the following structure in accordance with the present invention.

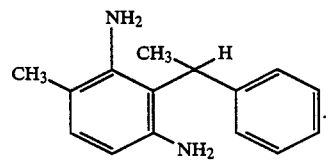

EXAMPLE 8

The apparatus described in Example 4 was charged with 12.2 g. (0.1 mole) of 2,4-toluenediamine, 58.0 g. (0.5 mole) of indene (practical grade >90% purity, supplied by Aldrich Chem. Co., Milwaukee, Wis.), and 10 g. of Zeolite XZ-25.

The mixture was stirred and heated under nitrogen according to the procedure set forth in Example 4, first at 160° C. for 16 hours but then temperature was increased to 185° C. and heating continued thereat for another 7 hours. During this heating moisture was distilled off from the catalyst.

On conclusion of the heating the reaction mixture was filtered hot through a heated Buchner funnel to remove catalyst. The filtrate was first distilled to remove the excess indene; b.p. 40° C. (0.05 mm. pressure of mercury), wt.=33.5 g. of indene. The residue was then fractionated through a 5 cm. hollow column under 0.05 mm. of pressure. The following fractions were collected: (1.) b.p. 115°-130° C.; (2.) b.p. 130-160° C.; combined wt. of 1 and 2=0.8 g. of 2,4-toluenediamine; (3) (4) b.p. 172°-186° C., combined with 3 and 4=3.7 g.; (5.) b.p. 186°-200° C., wt.=10.4 g.; (6.) b.p. 200°-204° C., wt.=1.2 g.;(7.) b.p. 204°-240° C., wt.=9.0 g.; residue, wt.=12.2 g.

Fractions 3 and 4 were combined and chromatogramed through a column of silica gel (1"×14"). The column was eluted first with 400 ml. of petroleum ether (b.p. 35°-60° C.) followed by mixtures of 400 ml. of petroleum ether/methylene chloride at 85/15 parts ratio and 400 ml. at 1/1 parts. Fractions were collected, evaporated, and analyzed by Nmr. The following numbered fractions were the ones yielding the significant eluted products; also shown are the solvent mixture parts ratios and product identity.

Chromatographic column fraction 1 (petroleum ether), wt.=1.8 g. unknown yellow oil; column fractions 9, 10 and 11 (petroleum ether/methylene chloride 85/15), wt. =1.1 g., 3-(1-indanyl)-2,4-toluenediamine; column fractions 16 and 17 (petroleum ether/methylene chloride 1/1), wt.=0.65 g., 5-(1-indanyl)-2,4-toluenediamine.

Distillation fraction 7 was subjected to column chromatography following the same procedure described above and chromatographic column fractions 10 and 11 obtained by elution with 400 ml. of petroleum ether/methylene chloride 7/3 yielded after evaporation 3,5-bis(1-indanyl)-2,4-toluenediamine.

The 3-(1-indanyl)-2,4-toluenediamine obtained from chromatographic column fraction 10 of distillation fractions 3 and 4 above had crystallized and the material was recrystallized from hot methylene chloride and petroleum ether (50/50) to provide colorless crystals, m.p. 122.5°-124° C.; Nmr analysis and the following elemental analysis confirmed the following structure in accordance with the present invention.

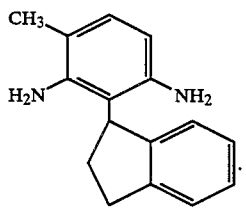

Calcd. for $C_{17}H_{18}N_2$: C, 80.63%; H, 7.61%; N, 11.76%; Found: C, 79.75%; H, 7.46%; N, 11.52%.

The 5-(1-indanyl)-2,4-toluenediamine obtained from chromatographic column fractions 16 and 17 of distillation fractions 3 and 4 remained an oil. It was distilled under 0.05 mm. pressure of mercury, b.p. 194°-196° C. and remained a very viscous oil. Nmr analysis confirmed the following structure in accordance with the present invention.

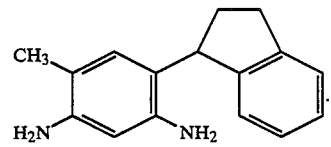

The 3,5-bis(1-indanyl)-2,4-toluenediamine obtained from chromatographic column fraction 10 of distillation fraction 7 above solidified on standing to form a glass, fusion at 93°-97° C. Nmr and the following elemental analysis confirmed the following structure in accordance with the present invention.

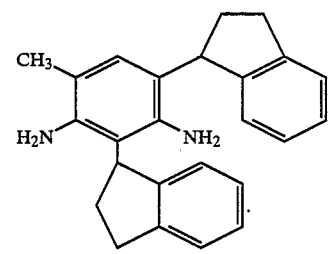

Calcd. for $C_{25}H_{26}N_2$: C, 84.70%; H, 7.39%; N, 7.91%; Found: C, 84.68%; H, 7.39%; N, 7.86%.

The reaction was repeated using the same apparatus described above using 24.4 g. (0.2 mole) of 2,4-toluenediamine, 11.6 g. (0.1 mole) of indene (>90% purity described above), and 10 g. of the Zeolite catalyst. The mixture was refluxed at 200° C. for 7 hours. A small amount of indene was still refluxing which indicated incompleteness of reaction. However, after cooling, the mixture was diluted with methylene chloride and filtered to remove catalyst. An equal volume of petroleum ether (b.p. 35°-60° C.) was added to the solution causing the precipitation of 2,4-toluenediamine (12.4 g., 51% recovery dry isolated weight).

The mother liquor which still contained some toluenediamine was washed 4×with 50 ml. portions of water. The organic layer was separated and solvent removed under vacuum to yield 21.3 g. of residue. The residue was distilled under 0.05 mm. of mercury pressure through a 5 cm. hollow column and the following fractions collected and identified by Nmr and comparison to the products isolated above.

Forerun boiling up to 35° C., wt.=1.1 g. of unreacted indene;(1.) b.p. 175°-184° C., wt.=0.98 g., mixture of the 3- and 5-(1-indanyl)-2,4-toluenediamine;(2.) b.p. 184°-187° C.; (3.) b.p. 187°-188° C.;(4.) b.p. 188° C. constant, fractions 2 to 4, wt.=13.7 g. predominantly the 5-indanyl isomer with some of the 3-isomer;(5.) b.p. 188°-196° C., wt.=2.0 g. pure 5-indanyl isomer; (6.) b.p. 196°-225° C., wt.=0.98 g., 5-indanyl isomer plus a very small amount of the 3,5-bis(1-indanyl)-2,4-toluenediamine; residue wt.=1 g.

The overall product yield of 17.7 g. (74.4%) was comprised of the 5-(1-indanyl)-2,4-toluenediamine as the major product, with the 3-isomer as a minor component, and the bis compound in small amount.

EXAMPLE 9

Using the apparatus and procedure set forth in Example 4, a 12.2 g. sample (0.1 mole) of a mixture of 2,6- and 2,4-toluenediamine in the proportioned parts of 18.3/81.7 respectively was mixed with 59.0 g. (0.5 mole) of α-methylstyrene, and 10 g. of Zeolite XZ-25. The stirred mixture was heated at 160° C. under nitrogen and aliquots were withdrawn periodically and analyzed by HPLC. The following table of data sets forth the weight percent concentrations of the three following diamines all in accordance with the present invention and the two isomeric starting diamines (2,6-, and 2,4-toluenediamine) as measured at three different reaction intervals in the mixture. The three product diamines are 3,5-bis(α,α-dimethylbenzyl)-2,6-toluenediamine, 3-(α,α-dimethylbenzyl)2,6-toluenediamine, and 5-(α,α-dimethylbenzyl)-2,4-toluenediamine, code named 1, 2 and 3 respectively.

| Reaction time (hrs.) | (1) | (2) | (3) | 2,6- | 2,4- |
|---|---|---|---|---|---|
| 9 | 2.0% | 14.3% | 73.5% | 1.9% | 8.3% |
| 25 | 7.7% | 9.4% | 75.4% | 0.4% | 6.9% |
| 45 | 10.2% | 8.9% | 75.1% | 0.4% | 5.4% |

The reaction mixture was worked-up identically to the procedure set forth in Example 4. Distillation if the crude reaction product under high vacuum (described in Example 4) provided the following product distribution and overall yield of materials: 0.0104 mole of dibenzylated product (1), 0.0752 mole of the mixture of the monobenzylated products (2) and (3) to give an overall yield of 75.6%. HPLC analysis showed the weight percent distribution of (1), (2), and (3) in the isolated products based on their combined weights to be 10.5%, 10.1%, and 79.4% respectively

EXAMPLE 10

A 250 ml 3-necked flask equipped with a magnetic stirrer, a thermometer, a reflux condenser (equipped with a nitrogen inlet tube), and a short path distillation head with condenser, receiver and a nitrogen outlet, was charged with a mixture of 9.76 g.(0.08 mole) of 2,4-toluenediamine and 2.44 g. (0.02 mole)of 2,6-toluenediamine, 59.1 g. (0.5 mole) of α-methylstyrene, 0.055 g. of hydroquinone, and 1.9 g. (0.01 mole) of p-toluene sulfonic acid monohydrate.

The system was flushed with nitrogen and then under a slow stream of nitrogen and during continual stirring the reaction mixture was heated rapidly to 160° C. Water of hydration from the sulfonic acid was released starting at about 120° C., carried from the reaction flask with the nitrogen stream, and collected in the receiver with a small amount of α-methylstyrene. When the water generation stopped, the nitrogen outlet was closed and the system maintained under a slight positive pressure of nitrogen by means of a gas bubbler.

Aliquot samples were withdrawn from the reaction mixture periodically (circa ever hour) and analyzed by HPLC (column material was μ-Porasil and the elutant was a mixture of acetonitrile and 1,2-dichloroethane in a volume/volume ratio of 490/3000.

When conversion of the diaminotoluene reached about 75 percent, in about 3 hours, the weight percent concentrations of the starting amines and products was as follows:

| | |
|---|---|
| 2,4-toluenediamine = | 13.7% |
| 2,6-toluenediamine = | 7.2% |
| 5-(α,α-dimethylbenzyl)-2,4-toluenediamine = | 63.0% |
| 3-(α,α-dimethylbenzyl)-2,6-toluenediamine = | 14.5% |
| 3,5-bis(α,α-dimethylbenzyl)-2,6-toluenediamine = | 1.6% |

The reaction was stopped at this point and cooled rapidly (within 0.5 hour) first by forced air and then by cold water bath to room temperature (circa 20° C.) during continuous stirring. As the reaction mixture cooled, p-toluene sulfonic acid crystallized out gradually as the salt of a toluenediamine.

After 2 hours at room temperature, 30 ml. of methylene chloride was added to the reaction mixture which was then stirred for 1 hour. The mixture was filtered and 2.83 g. (97% yield) of the 1:1 salt of p-toluene sulfonic acid and 2,4-toluenediamine was obtained. The sulfonic acid salt which was collected, was washed twice with 15 ml.portions of methylene chloride.

The filtrate and washings were combined and the small amount of residual acid in the solution was neutralized by bubbling a slow stream of anhydrous ammonia into the solution with stirring until the pH reached 8 to 9. The sulfonic acid precipitated as ammonium p-toluene sulfonate which was removed by filtration. Methylene chloride and ammonia were removed from the mixture by rotary evaporation under aspiratory vacuum (circa 20–30 mm of mercury pressure) at a temperature of up to about 40° C.

The excess α-methylstyrene was distilled at a head temperature of 70 to 80° C. under a pressure of about 23 mm of mercury and the residue was distilled under 0.03 mm of mercury and the following fractions were collected and identified by NMR:#1. b.p. 80°–155° C., wt.=3.1 g. of colorless distillate which crystallized at room temperature and contained 0.3 g. dimer of α-methylstyrene and 2.8 g. of a mixture of 2,4-toluenediamine, 2,6-toluenediamine, 5-(α,α-dimethylbenzyl)-2,4-toluenediamine, and 3-(α,α-dimethylbenzyl)-2,6-toluenediamine in the molar percent proportions of 54.9%, 23.1%, 17.8%, and 4.2% respectively; #2. b.p. 155°–175° C., wt.=15.0 g. yellow glass which was a mixture of 5-(α,α-dimethyl-benzyl)-2,4-toluenediamine, 3-(α,α-dimethylbenzyl)-2,6toluenediamine, and 3,5-bis-(α,α-dimethylbenzyl)-2,6toluenediamine in the molar proportions of 81.2%, 17.9%, and 0.9% respectively, and 0.1 g. of oligomers of α-methylstyrene as well as a trace of some N-alkylated side-products; #3. b.p. 175°–182° C., wt.=1.1 g. of orange colored distillate which was a mixture of 0.7 g. of 3,5-bis(α,α-dimethylbenzyl)-2,6-toluenediamine and 0.4 g. of oligomers of α-methylstyrene A residue of 0.3 g. of black tar remained in the stillpot.

Fraction #2 was essentially a pure mixture of three alkylated phenylenediamines in accordance with the present invention. The completely pure crystalline mixture of the three products is obtained from the glass by recrystallization from toluene and petroleum ether. The total yield of alkylated products based on converted toluene diamine starting material was 87%.

EXAMPLE 11

The following two molded polyurethane-polyurea polymers A and B were prepared by a hand-mix technique. Polymer A was in accordance with the present invention while Polymer B was prepared in accordance with the prior art.

The molded polymers were prepared by reacting the ingredients in the proportions of parts by weight set forth in Table I, as an A component with a B component. Both components were mixed at high speed at room temperature (about 20° C.) in quart tubs using a drill press motor equipped with a Conn 3" blade. The ingredients were mixed for about 5 to 6 seconds and then immediately poured into a metal mold measuring $7\frac{7}{8}'' \times 7\frac{7}{8}'' \times \frac{1}{4}''$ at 150° F. which mold was coated with a mold release agent (XMR-136 supplied by Chem-Trend Inc., Howell, Michigan 48843). The demold time was about 2 minutes for A and about 4 minutes for B. Both samples were post-cured for 1 hour at 250° .F and then subjected to the test procedures set forth in Table I.

The sample A in accordance with the present invention exhibited good physical and thermal properties. These properties, even if allowance is made for a density difference, are for the most part significantly better than those of the prior art sample B, particularly in regard to thermal stability.

TABLE I

| Sample | A | B |
|---|---|---|
| Ingredients (pts. by wt.) | | |
| A Component: | | |
| Polyisocyanate 1[1] | 57.9 (0.4008 eq.) | 78.44 (0.5432 eq.) |
| B Component: | | |
| E 2105[2] | 100 (0.1 eq.) | 100 (0.1 eq.) |
| 5-(α,α-dimethylbenzyl)-2,4-toluenediamine | 35 (0.2892 eq.) | — |
| Ethylene glycol | — | 13.25 (0.4274 eq.) |
| Dibutyl tin dilaurate | 0.125 | 0.125 |
| NCO/OH Index | 1.03 | 1.03 |
| [A]/[B] Ratio | 0.429 | 0.693 |
| Catalyst (total wt. %) | 0.064% | 0.065% |

TABLE I-continued

| Sample | A | B |
|---|---|---|
| % Hard segment | 40.7% | 40.3% |
| Properties: | | |
| Density (g./cc) | 1.078 | 0.914 |
| Shore D hardness | 55 | 35 |
| Tensile str. (psi) | 2720 | 1440 |
| Elongation at break (%) | 198 | 292 |
| Flexural modulus (psi) | 32,809 | 6201 |
| Flexural strength (psi) | 1954 | 434 |
| Heat sag, inches[3] at 250° F./1 hr | 0.085 | 0.32 |

Footnotes to TABLE I
[1]The polyisocyanate is a liquefied methylenebis(phenyl isocyanate) containing uretoneimine group, I.E. = 144.4.
[2]E 2105 is Thanol E 2105 ethyleneoxide capped poly-propyleneoxy glycol, 45% ethylene oxide content by wt., 2000 M.W.; supplied by Texaco Chem. Corp., Bellaire, Texas.
[3]Heat sag is determined in accordance with Test CTZ006AA of the Chevrolet Div. of General Motors Corp., Flint, Mich. It is the amount, in inches, that a 1 inch wide sample with a 4 inch long unsupported length droops under its own weight when held at one end in a horizontal position under the specified conditions of time and temperature.

I claim:
1. A diamine having the formula

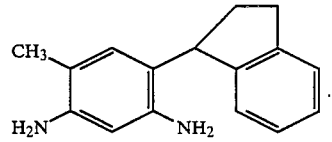

2. A diamine having the formula

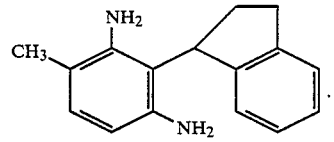

* * * * *